Jan. 11, 1955 W. A. GOSS 2,699,025
CUTTER BAR MOUNTING
Original Filed March 26, 1951 8 Sheets-Sheet 1

INVENTOR.
WILLIAM A. GOSS
BY
ATTORNEYS

Jan. 11, 1955 W. A. GOSS 2,699,025
CUTTER BAR MOUNTING
Original Filed March 26, 1951 8 Sheets-Sheet 2

FIG.3.

INVENTOR.
WILLIAM A. GOSS
BY
ATTORNEYS

Jan. 11, 1955 W. A. GOSS 2,699,025
CUTTER BAR MOUNTING

Original Filed March 26, 1951 8 Sheets-Sheet 3

INVENTOR.
WILLIAM A. GOSS
BY
ATTORNEYS

INVENTOR.
WILLIAM A. GOSS
BY Whittemore,
Hulbert & Belknap
ATTORNEYS

Jan. 11, 1955     W. A. GOSS     2,699,025
CUTTER BAR MOUNTING

Original Filed March 26, 1951     8 Sheets-Sheet 5

*INVENTOR.*
WILLIAM A. GOSS
BY Whittemore
Hulbert & Belknap
ATTORNEYS

Jan. 11, 1955 W. A. GOSS 2,699,025
CUTTER BAR MOUNTING
Original Filed March 26, 1951 8 Sheets-Sheet 6

INVENTOR.
WILLIAM A. GOSS
BY Whittemore,
Hulbert & Belknap
ATTORNEYS

Jan. 11, 1955   W. A. GOSS   2,699,025
CUTTER BAR MOUNTING
Original Filed March 26, 1951   8 Sheets-Sheet 7

*INVENTOR.*
WILLIAM A. GOSS
BY
ATTORNEYS

Jan. 11, 1955  W. A. GOSS  2,699,025
CUTTER BAR MOUNTING
Original Filed March 26, 1951  8 Sheets-Sheet 8

INVENTOR.
WILLIAM A. GOSS
BY Whittemore,
Hulbert & Belknap
ATTORNEYS

United States Patent Office 2,699,025
Patented Jan. 11, 1955

1

2,699,025

CUTTER BAR MOUNTING

William A. Goss, Zanesville, Ohio, assignor to Detroit Harvester Company, Detroit, Mich., a corporation of Michigan Original application March 26, 1951, Serial No. 217,451. Divided and this application April 29, 1952, Serial No. 285,017

3 Claims. (Cl. 56—25)

The present invention relates to cutter bar mounting and more particularly, to means for mounting a cutter bar and drag bar combination to a tractor.

The present invention is a division of my copending application Serial No. 217,451, filed March 26, 1951.

It is an object of the present invention to provide means for mounting one end of a drag bar to a tractor for restricted universal swinging movement and for angular adjustment about its own axis.

It is a further object of the present invention to provide a drag bar, means mounting one end of the drag bar to the tractor for universal adjustment, a pull bar extending forwardly from the drag bar to prevent rearward swinging movement thereof, and means associated with the drag bar and pull bar for effecting angular adjustment of the drag bar about its longitudinal axis.

It is a further object of the present invention to provide quick detachable mounting means for a drag bar comprising a universal connection at one end of the drag bar, a pull bar extending forwardly from the drag bar, a slotted plate carried by the tractor forwardly of the drag bar, and resilient abutment means at the forward end of the pull bar whereby the pull bar may be inserted into the slot of the plate and removed therefrom in assembly and disassembly of the mower structure relative to the tractor.

Other objects and features of the invention will become apparent as the description proceeds, especially when taken in conjunction with the accompanying drawings, wherein:

Referring now to the drawings, the invention relates to a tractor-mower combination and in general the parts of the tractor are illustrated in broken lines. The tractor is of the type comprising a frame 10, front wheels 12 connected by a front axle 14, rear wheels 16 connected by a rear axle 18, the tractor having a power take-off indicated generally at 20, and a power lift lever 22.

The mower mechanism is designed for quick attachment to and detachment from the tractor and includes parts which are permanently secured to the tractor.

At the left side of the tractor there is permanently secured thereto a frame member comprising an angle iron 24 having welded or otherwise secured to its forward end a plate 26 shaped to conform to the body of the tractor and adapted to be bolted to a flange 28 of the tractor by assembly bolts 30. At its rear end the angle iron 24 is welded or otherwise secured to a plate 32 which in turn is bolted to flanges 34 of the tractor by bolts 36.

Figure 13:
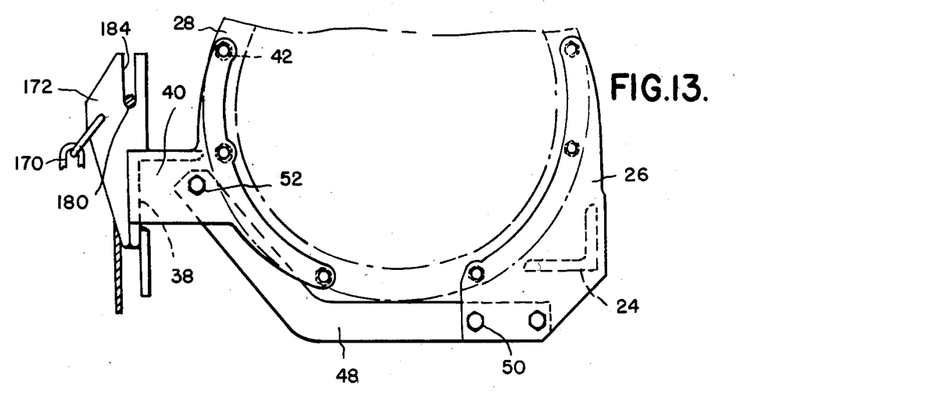
Figure 13 is a fragmentary elevational view of the drag bar supporting mechanism permanently attached to the tractor, looking generally in the direction of the arrows 13—13, Figure 10, and showing portions of the tractor in broken lines.

Referring now to Figure 13, the tractor is provided at its right hand side with a second angle iron 38 welded or otherwise secured to a plate 40 which is bolted or otherwise secured to flanges 28 of the tractor by assembly bolts 42. At its opposite end the angle iron 38 has welded or otherwise secured thereto an extension 44 (Figure 3) which is bolted or otherwise secured to a bracket 46 forming a part of the tractor.

Interconnecting plates 40 and 26 is a strap 48 bolted to the plate 26 as indicated at 50, and bolted to the plate 40 as indicated at 52.

Figures 10, 11, 12:
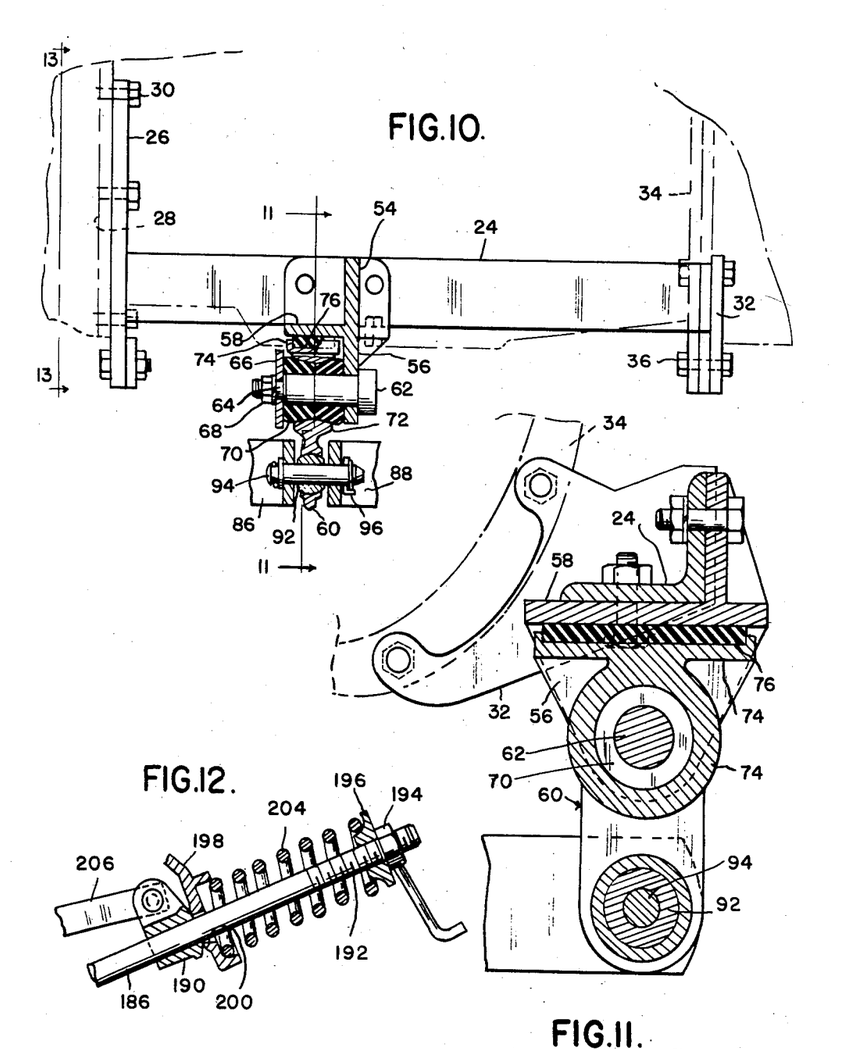
Figure 10 is an enlarged view of the drag bar supporting mechanism as seen from the left hand side of the tractor, with parts broken away and shown in section.
Figure 11 is an enlarged sectional view on the line 11—11, Figure 10.
Figure 12 is a side elevation of the front end of the pull rod construction, with parts broken away and shown in section.

The angle iron 24, which as described is permanently secured to the left hand side of the tractor, serves as the means for mounting a drag bar which will subsequently be described. The mounting means, as best seen in Figures 10 and 11, comprises a fixed bracket 54 bolted or otherwise rigidly secured to the angle iron 24. The bracket 54 includes a vertically extending flange 56 and a horizontally extending flange 58, the flange 56 occupying a plane extending transversely of the tractor, and the flange 58 extending forwardly from the front side of the flange 56. A movable bracket 60 is connected to the fixed bracket 54 and for this purpose the lower portion of the vertical flange 56 is apertured to receive an assembly stud 62. The assembly stud has an intermediate enlarged portion and a reduced end portion 64, and is provided with a washer 66 urged against the shoulder at the end of the intermediate enlarged portion by a nut 68. Surrounding the intermediate enlarged portion of the stud 62 are a pair of rubber bushings 70 and these are compressed between the flange 56 and the washer 66. The movable bracket 60 includes a relatively large eye portion 72 surrounding the bushings 70 and at the upper end of the eye portion there is provided a flat recessed seat 74 spaced directly beneath the horizontal flange 58. Located in the recessed seat 74 is a rubber pad 76 which is compressed between the recessed seat 74 and the underside of the flange 58. From the foregoing construction it will be observed that the movable bracket 60 is carried by the fixed bracket 54, but is not in direct contact therewith at any point. More specifically, intermediate adjacent portions of the fixed bracket 54 and the movable bracket 60 there is provided rubber or similar resilient material which thus mounts the movable bracket 60 for limited universal movement with respect to the fixed bracket 54, and further, by this construction the movable bracket 60 is completely cushioned with respect to the fixed bracket 54.

Figures 8, 9:
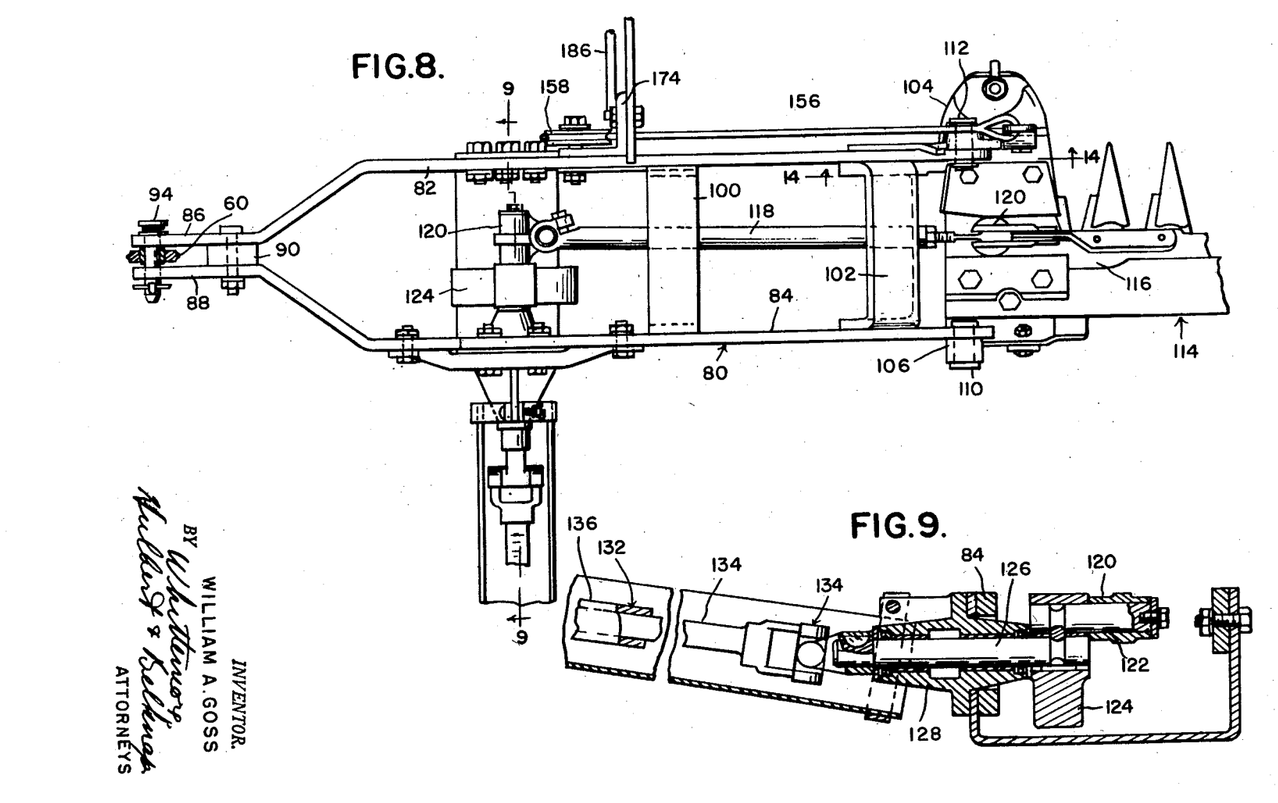
Figure 8 is an enlarged plan view of the drag bar structure and associated mechanism.
Figure 9 is a section on the line 9—9, Figure 8.

Connected to the lower end of the movable bracket 60 is a drag bar indicated generally at 80 composed of a pair of elongated straps 82 and 84. Adjacent the left hand end of the drag bar 80 the straps 82 and 84 converge, as best illustrated in Figure 8, and include end portions 86 and 88 held in predetermined spaced relation by a spacer member 90, and receiving the lower portion of the bracket 60 therebetween.

Referring again to Figures 10 and 11, the lower portion of the bracket 60 is provided with a spherical seat in which is received a ball part 92 having a pin receiving opening therethrough. The ends of the drag bar portions 86 and 88 are apertured to receive the coupling pin 94 and this pin is provided with a quick releasable retainer pin 96. As will be readily apparent, removal of the retainer pin 96 permits withdrawal of the coupling pin 94 and disconnects the drag bar from the tractor.

Referring now to Figures 3, 4, 8 and 9, the drag bar as previously described, comprises the two elongated straps 82 and 84, and these straps are interconnected by transverse connector straps 100 and 102. Secured to the right hand or free end of the drag bar 80 is a shoe 104, the shoe having upstanding ears 106 and 108 between which are received the outer ends of the straps 82 and 84. A longitudinal pivot axis is established between the drag bar and the shoe 104 by pivot bolts 110 and 112.

Rigidly connected to the shoe 104 is a cutter bar 114, and longitudinally reciprocable on the cutter bar is a sickle 116.

Means are provided for effecting reciprocation of the sickle in all positions of adjustment of the drag bar 80 and this means comprises a pitman rod 118 having a ball and socket connection as illustrated at 120, with the sickle bar. At its inner end the pitman rod 118 is swiveled to a coupling member 120 which in turn is journaled in a crank pin 122 carried by a fly wheel 124. The fly wheel 124 is mounted on a shaft 126 journaled in a bearing block 128 extending through an opening in the drag bar strap 84. The shaft 126 is connected by a universal joint 130 to the forward end of a telescoping drive shaft 132 composed of a forward reduced section 134 and a tubular rear portion 136, these parts being longitudinally slidable relative to each other but designed to transmit torque, as for example by reason of being of non-circular cross-section.

Figure 1:
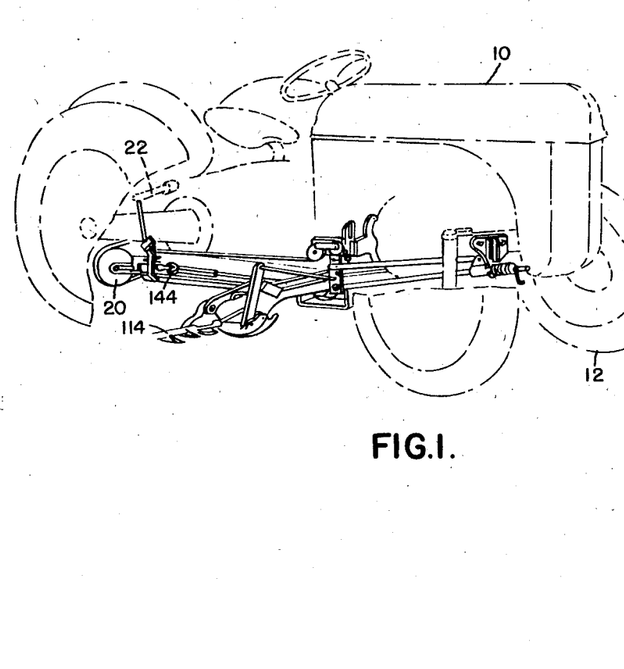
Figure 1 is a perspective view of the tractor-mower with the tractor structure indicated in broken lines.
Figure 2:
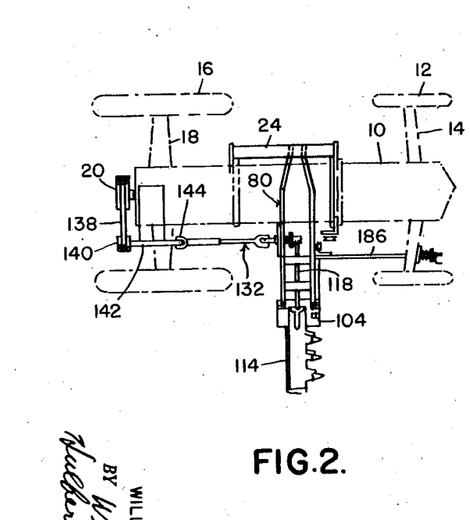
Figure 2 is a plan view on a reduced scale of the tractor-mower with the tractor structure shown in broken lines.

The means for reciprocating the sickle bar comprises the power take-off pulley 29 illustrated in Figure 2, a driving belt 138, a pulley 140, and a drive shaft 142, the forward end of the drive shaft 142 being connected to the shaft 132 by a universal joint illustrated at 144.

Figure 14:
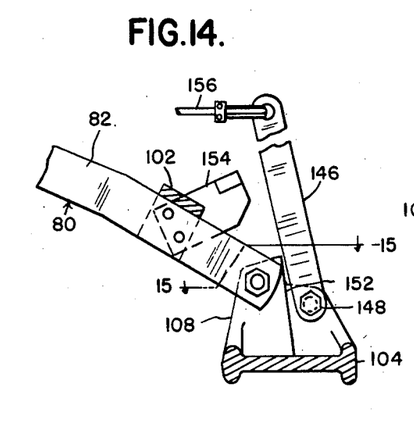
Figure 14 is a section on the line 14—14, Figure 8.
Figure 15:
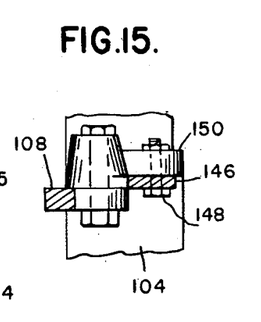
Figure 15 is a section on the line 15—15, Figure 14.

Power means are provided for controlling the vertical position of the drag bar 80 and the cutter bar 114. This mechanism is best illustrated in Figures 3, 4, 14 and 15, and comprises a combined lifting and tilting arm 146 pivoted to the shoe 104 as indicated at 148. As best seen in Figures 14 and 15, the ear 108 at the forward end of the shoe 104 includes an offset portion 150 to which the arm 146 is pivoted. Forwardly of the offset portion 150 the ear 108 includes an abutment portion 152 adapted to be engaged by the arm 146 when it is swung to the left from the position illustrated in Figure 14.

The drag bar strap 82 has secured thereto an abutment 154 adapted to be engaged by the lift arm 146 upon predetermined swinging movement thereof.

Secured to the upper end of the lift arm 146 is a cable 156. Carried by the drag bar 80 intermediate its ends is a sheave 158. Mounted on the angle iron 38 are a pair of sheaves 160 and 162. Located adjacent the rear of the tractor is a sheave 164. The cable 156 extends beneath the sheave 158, thence upwardly over the sheave 162 and under the sheave 160, and thence rearwardly under the sheave 164 and upwardly to the power lift lever 22.

Figure 3:
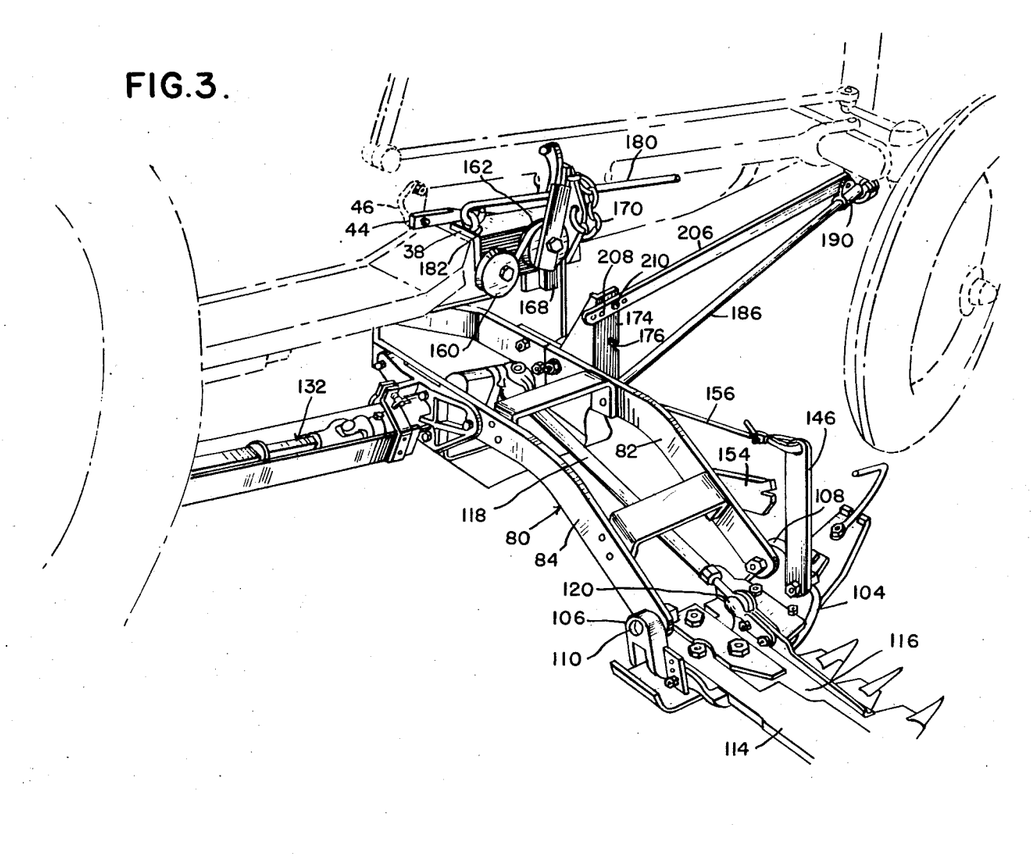
Figure 3 is an enlarged fragmentary perspective view of the tractor-mower looking forwardly from the right hand side of the tractor.

When the power lift lever is raised the cable 156 draws on the lift arm 146 and rocks it initially into engagement with the abutment 152 provided on the shoe 104. Thereafter, further movement of the lift arm 146 lifts the shoe 104 and raises the cutter bar 114. After a predetermined lifting movement of the cutter bar 114, the lift arm 146 engages the abutment 154 on the drag bar. The parts are designed so that approximately 15 degrees lifting movement of the cutter bar is provided. Further movement of the cable 156 results in swinging the drag bar 80 and the cutter bar 114 upwardly as a unit about the axis of the coupling pin 94. Upward movement of the drag bar is limited by engagement between the drag bar and a downwardly extending abutment or stop 168 which extends downwardly from the angle iron 38, as best seen in Figure 3.

Means independent of the power lift mechanism are provided for suspending the drag bar 80 in any position of adjustment. This means comprises a chain 170 carried by a plate 172 mounted on the angle iron 38, as best seen in Figure 13. Mounted on the drag bar intermediate its ends is an angle member 174 having an upwardly inclined slot 176. A selected link of the chain 170 may be introduced into the slot 176 to thereby suspend the drag bar 80 independently of the power lift mechanism.

Figure 7:
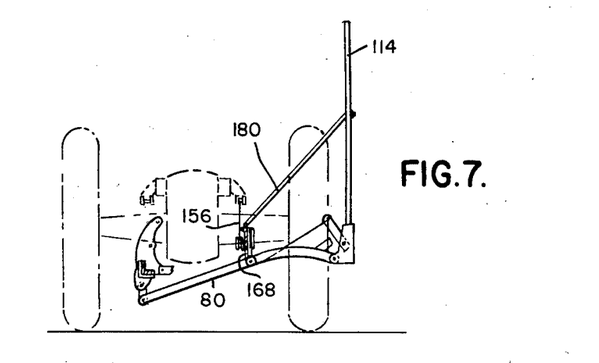
Figure 7 is a view similar to Figure 5 showing the drag bar and cutter bar in transport position.

Means are also provided for holding the cutter bar 114 in fully elevated, substantially vertical position during transport. This mechanism comprises a transport rod 180 pivoted to an eye 182 carried by the angle iron 38 for universal movement relative thereto. At is outer end the transport rod 180 is threaded and is adapted to enter an opening in the cutter bar and to be retained therein by a nut as illustrated in Figure 7. The plate 172 carried by the angle iron 38 is provided with an upwardly extending notch 184 into which the transport rod 180 may be introduced when not in use.

Figure 4:
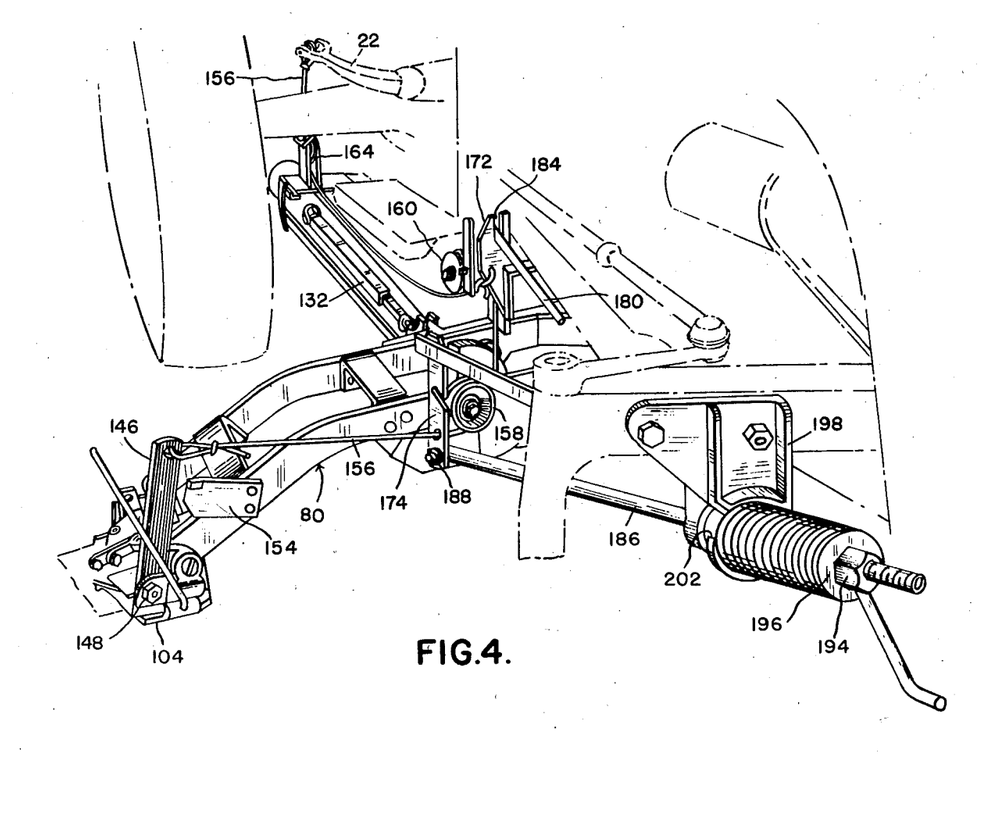
Figure 4 is an enlarged fragmentary perspective view of the tractor-mower looking rearwardly from the right hand side of the tractor.

In order to restrict rearward swinging of the drag bar 80 and cutter bar 114, the angle member 174 which is rigidly connected to the drag bar 80, has connected thereto a forwardly extending pull rod 186. The pull rod 186 is pivotally connected to the angle member 174 as indicated at 188. Adjacent the forward end of the pull rod 186 there is provided an abutment member 190 and the forward end of the pull rod 186 is threaded as indicated at 192 for the reception of an adjusting nut 194 cooperating with an annular spring abutment 196. Rigidly carried by a portion of the tractor, and specifically, the front axle thereof as indicated in the figures is a bracket 198 having an opening 200 therethrough for the reception of the forward end of the pull rod 186. The bracket 198 is provided with a transverse slot 202 as best seen in Figure 4, communicating with the opening 200 so that the pull rod 186 may be introduced into engagement with the bracket by lateral movement rather than by requiring removal of the nut 194. Interposed between the forward surface of the bracket 198 and the spring seat 196 is a coil compression spring 204. This coil compression spring acts through the spring seat 196 and the nut 194 and urges the pull rod 186 forwardly to retain the drag bar 80 in operating position. However, when the drag bar encounters a rigid obstacle the spring 204 yields to permit limited rearward swinging movement of the drag bar.

As best seen in Figures 3 and 12 the abutment member 190 has pivoted thereto a link 206, and at its rearward end the link 206 is provided with a plurality of openings 208. Angle member 174 extends upwardly from drag bar 80 and constitutes an adjusting arm therefor, and for this purpose the fastening element 210 extends through a selected one of the openings 208 in the link 206 and into the member 174. This provides for angular adjustment of the drag bar 80 about its longitudinal axis passing through the ball member 92.

Figure 16:
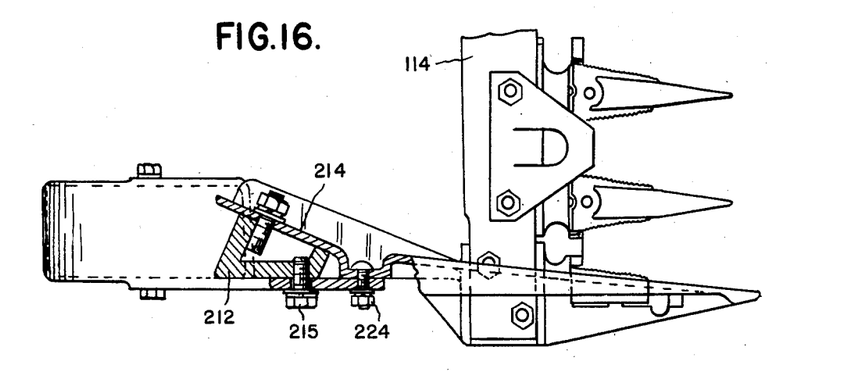
Figure 16 is an enlarged plan view of the outer end of the cutter bar looking in the direction of the arrows 16—16, Figure 6, with parts broken away.
Figure 17:
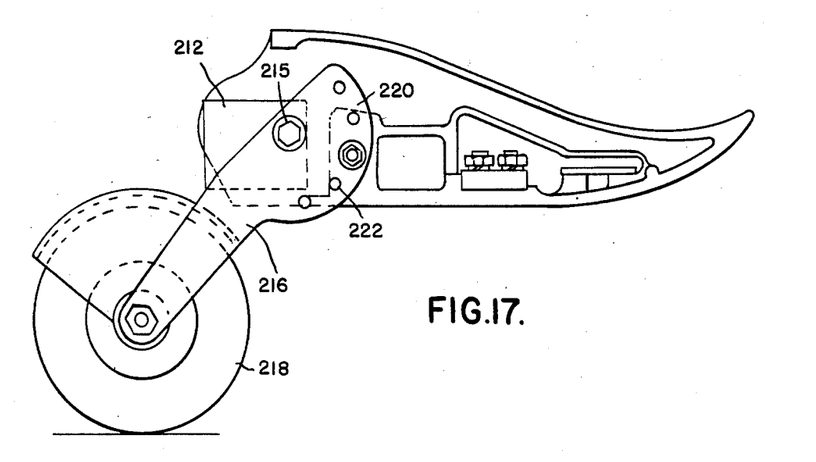
Figure 17 is an end elevation of the end of the cutter bar looking in the direction of the arrows 17—17, Figure 6.

Referring now to Figures 16 and 17, there is illustrated means for supporting the outer end of the cutter bar at a predetermined distance above the ground. This means comprises a block 212 bolted or otherwise secured to the guard plate 214 extending rearwardly from the outer end of the cutter bar 114. Pivotally secured to the block 212 by a pivot bolt 215 is a supporting arm 216 carrying a ground engaging wheel 218 at its lower end. The arm 216 includes an arcuate portion 220 provided with a plurality of openings 222 and adjustment of the arm 216 is effected by aligning a selected one of the openings 222 with a corresponding opening in the guard plate 214 and rigidly connecting the arm to the guard plate by bolt means indicated at 224. Obviously, angular adjustment of the arm 216 results in varying the elevation of the outer end of the cutter bar relative to the ground.

Figure 5:
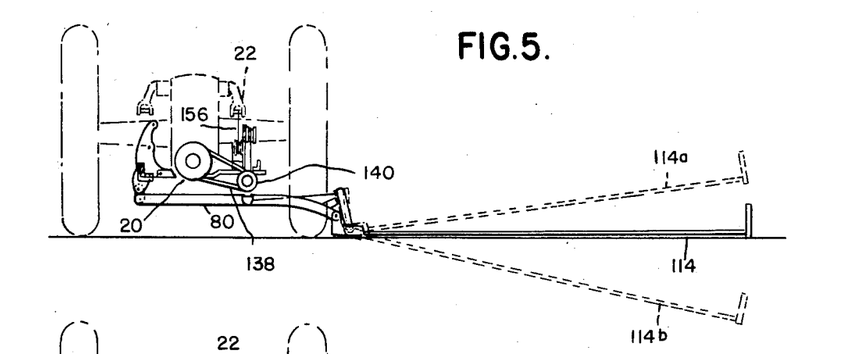
Figure 5 is a more or less diagrammatic view of the tractor-mower looking forwardly from the rear of the tractor.
Figure 6:
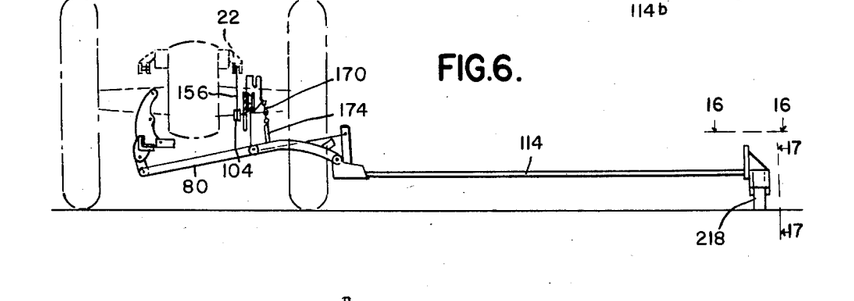
Figure 6 is a view similar to Figure 5 showing the drag bar and cutter bar in a different position of adjustment.

Referring now to Figures 5, 6 and 7 there is illustrated some of the adjustments rendered possible by the present construction. In Figure 5 the drag bar 80 is illustrated in its lowermost position and the cutter bar 114 is shown in full lines in horizontal position and resting substantially directly on the ground. If now the power lift mechanism is operated to draw on the cable 156 the lift arm 146 is moved into engagement with the abutting surface 152 of the shoe and the shoe and cutter bar assembly may thus be elevated a predetermined amount as for example 15 degrees. The cutter bar is shown in dotted lines at 114a in this elevated position. When the power lift mechanism is inoperative the cutter bar is free to conform to variations in slope of the ground and may swing above and below horizontal, a position below horizontal being illustrated at 114b.

If it is desired to carry out the mowing operation at a predetermined distance above the ground, the power lift mechanism may be further actuated to swing the drag bar 80 to an intermediate elevated position such as illustrated in Figure 6. With the drag bar and cutter bar in elevated position the suspension chain 170 may be engaged with the member 174 carried by the drag bar 80 and the drag bar retained thereby in elevated position independently of the power lift mechanism. Thereafter, when the power lift mechanism is operated to slack off the cable 156, the cutter bar 114 will swing downwardly. At this time appropriate adjustment of the ground wheel 218 may be made to support the outer end of the cutter bar 114 the proper distance above the ground to cause the cutter bar to remain parallel to the ground, as illustrated in Figure 6.

When it is desired to transport the tractor without carrying out the mowing operation, the power lift mechanism is operated to elevate the drag bar to its fully elevated position as determined by engagement with the stop 168 at which time the chain 170 may be engaged to suspend the drag bar in elevated position independently of the power lift mechanism. Thereafter, the cutter bar 114 may be manually lifted to the vertical position illustrated in Figure 7 and engaged by the transport rod 180 as previously described.

The drawings and the foregoing specification constitute a description of the improved cutter bar mounting in such full, clear, concise and exact terms as to enable any person skilled in the art to practice the invention, the scope of which is indicated by the appended claims.

What I claim as my invention is:

1. In a tractor-mower, a fixed bracket rigidly secured to the tractor and comprising a horizontally disposed flange and a vertical flange depending from one side of said horizontal flange and disposed transversely of the tractor, said vertical flange having an opening therethrough, a pivot pin extending through said opening having a head at one end engageable with said vertical flange and a reduced portion at its other end, a washer on the reduced end of said pin, a rubber bushing surrounding said pin and abutting said vertical flange and washer, a pivot bracket having an eye surrounding said bushing and horizontal flat portion above said eye spaced from said horizontal flange, a rubber pad received between said flat portion and said horizontal flange, said pivot bracket at its lower end having a ball socket, a ball part universally movable in said socket, and a mower drag bar connected at one end to said ball part.

2. In a tractor-mower combination a drag bar extending transversely of the tractor and pivoted at one end to the tractor for universal swinging movement, an apertured bracket carried by the tractor forwardly of said drag bar, a pull rod pivoted to said drag bar and extending forwardly through the aperture in said bracket, a stop element on said pull rod engaging the rear of said bracket to limit forward movement of said pull rod, a compression spring surrounding the forward end of said pull rod, an adjustable nut on the forward end of said pull rod engaging said spring, a lever extending upwardly from said drag bar, and an adjustable link connecting said lever and said stop element to effect adjustment of said drag bar about its own longitudinal axis.

3. A tractor-mower comprising a tractor, a drag bar secured at one end to said tractor for vertical swinging, for rocking about its longitudinal axis, and for limited rearward swinging, a pull rod extending forwardly from said drag bar, a bracket permanently fixed to said tractor forwardly of said drag bar, said bracket having an opening therethrough, the forward end of said rod extending through said opening, a compression spring on said rod forwardly of said bracket and seated against said bracket, an abutment on said rod engaging the other end of said spring, a second abutment on said rod rearwardly of said bracket limiting forward swinging movement of said drag bar, a lever extending upwardly from said drag bar, and an adjustable link extending from said lever to said second abutment.

References Cited in the file of this patent

UNITED STATES PATENTS

| | | |
|---|---|---|
| Re. 21,819 | Korsmo et al. | June 3, 1941 |
| 2,311,095 | Simpson et al. | Feb. 16, 1943 |
| 2,354,710 | Simpson et al. | Aug. 1, 1944 |